US008694484B2

(12) United States Patent
Sasaki

(10) Patent No.: US 8,694,484 B2
(45) Date of Patent: Apr. 8, 2014

(54) CONTENT MANAGEMENT DEVICE, CONTENT MANAGEMENT SYSTEM, AND CONTENT MANAGEMENT METHOD

(75) Inventor: Hiroyuki Sasaki, Chita (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 13/428,358

(22) Filed: Mar. 23, 2012

(65) Prior Publication Data

US 2012/0191750 A1 Jul. 26, 2012

Related U.S. Application Data

(63) Continuation of application No. 12/397,335, filed on Mar. 3, 2009, now Pat. No. 8,239,360.

(30) Foreign Application Priority Data

Mar. 27, 2008 (JP) ................................. 2008-083130

(51) Int. Cl.
*G06F 7/00* (2006.01)
*G06F 17/30* (2006.01)

(52) U.S. Cl.
CPC ................................ *G06F 17/30864* (2013.01)
USPC ........................................................ 707/706

(58) Field of Classification Search
None
See application file for complete search history.

(56) References Cited

U.S. PATENT DOCUMENTS

| | | | |
|---|---|---|---|
| 6,549,913 B1 * | 4/2003 | Murakawa | ............................ 1/1 |
| 6,898,586 B1 | 5/2005 | Hlava et al. | |
| 7,239,406 B1 | 7/2007 | Piersol et al. | |
| 7,516,146 B2 | 4/2009 | Robertson et al. | |
| 7,647,299 B2 | 1/2010 | Harik | |
| 7,725,502 B1 | 5/2010 | Badros et al. | |
| 7,827,198 B2 | 11/2010 | Narahara et al. | |
| 2003/0051208 A1 | 3/2003 | Todaka et al. | |

(Continued)

FOREIGN PATENT DOCUMENTS

| | | |
|---|---|---|
| EP | 1102472 A1 | 5/2001 |
| JP | H06-215089 A | 8/1994 |

(Continued)

OTHER PUBLICATIONS

Japan Patent Office, Notification of Reason for Refusal for Japanese Patent Application No. 2008-083130 (counterpart to co-pending U.S. Appl. No. 12/397,335), dispatched May 11, 2010.

(Continued)

*Primary Examiner* — Jay Morrison
(74) *Attorney, Agent, or Firm* — Baker Botts L.L.P.

(57) ABSTRACT

A content management device for managing acquired content in a searchable manner, includes a storage device that stores a search database in which a plurality of keywords and content are registered; a registration unit that registers new content in the search database; and a search unit that searches content registered in the search database. The registration unit performs operations includes: extracting a plurality of keyword candidates associated with the new content from the search database; displaying the extracted keyword candidates; and registering a keyword candidate designated from among the displayed keyword candidates in the search database, as a search keyword in association with the new content. The search unit performs operations includes: displaying a plurality of search keywords registered in the search database; extracting content associated with a search keyword designated from among the displayed search keywords from the search database; and displaying the extracted content.

10 Claims, 21 Drawing Sheets

(56) References Cited

U.S. PATENT DOCUMENTS

| | | |
|---|---|---|
| 2003/0086627 A1* | 5/2003 | Berriss et al. ............... 382/305 |
| 2004/0267725 A1 | 12/2004 | Harik |
| 2005/0144069 A1 | 6/2005 | Wiseman et al. |
| 2005/0165613 A1* | 7/2005 | Kim ................................ 705/1 |
| 2005/0174593 A1 | 8/2005 | Piersol et al. |
| 2005/0278379 A1 | 12/2005 | Nakazawa |
| 2006/0215936 A1 | 9/2006 | Dorfman et al. |
| 2006/0277208 A1 | 12/2006 | Starbuck et al. |
| 2007/0061368 A1 | 3/2007 | Johnson et al. |
| 2007/0136318 A1 | 6/2007 | Clark et al. |
| 2007/0156648 A1 | 7/2007 | Bridges et al. |
| 2007/0192310 A1 | 8/2007 | Takagi et al. |
| 2008/0082497 A1 | 4/2008 | Leblang et al. |
| 2008/0140706 A1* | 6/2008 | Kahn ....................... 707/103 R |
| 2008/0183697 A1 | 7/2008 | Narahara et al. |
| 2009/0248639 A1 | 10/2009 | Sasaki et al. |
| 2009/0248676 A1 | 10/2009 | Sasaki |

FOREIGN PATENT DOCUMENTS

| | | |
|---|---|---|
| JP | H06-231183 A | 8/1994 |
| JP | 2000-036880 A | 2/2000 |
| JP | 3047974 B1 | 9/2000 |
| JP | 2001-144893 A | 5/2001 |
| JP | 2001-249933 A | 9/2001 |
| JP | 2002-099574 A | 4/2002 |
| JP | 2002-183165 A | 6/2002 |
| JP | 2003-085178 A | 3/2003 |
| JP | 2003-140664 A | 5/2003 |
| JP | 2004-185212 A | 7/2004 |
| JP | 2004-295663 A | 10/2004 |
| JP | 2005-020256 A | 1/2005 |
| JP | 2005-115790 A | 4/2005 |
| JP | 2006-115544 A | 4/2006 |
| JP | 2006-330996 A | 12/2006 |
| JP | 2007-006537 A | 1/2007 |
| JP | 2008-181223 A | 8/2008 |
| JP | 2009-123114 A | 6/2009 |
| JP | 2009-237890 A | 10/2009 |
| JP | 2009-239617 A | 10/2009 |
| KR | 2006-0115262 A | 11/2006 |
| WO | 98/00786 A1 | 1/1998 |
| WO | 2006/104573 A2 | 10/2006 |

OTHER PUBLICATIONS

European Patent Office, European Search Report for European Patent Application No. 09250582.5 (counterpart to co-pending U.S. Appl. No. 12/397,335), dated Jun. 21, 2010.

Japan Patent Office, Notification of Reasons for Refusal for Japanese Patent Application No. 2008-083131 (counterpart to co-pending U.S. Appl. No. 12/397,306), dispatched May 25, 2010.

European Patent Office, European Search Report for European Patent Application No. 09250583.3 (counterpart to co-pending U.S. Appl. No. 12/397,306), dated Jun. 29, 2010.

Japan Patent Office, Notice of Reasons for Rejection for Japanese Patent Application No. 2008-083130 (counterpart to co-pending U.S. Appl. No. 12/397,335), dispatched Aug. 3, 2010.

Japan Patent Office, Decision of Refusal for Japanese Patent Application No. 2008-083130 (counterpart to co-pending U.S. Appl. No. 12/397,335), dispatched Oct. 26, 2010.

Japan Patent Office, Report of Reexamination before Appeal for Japanese Patent Application No. 2008-083130 (counterpart to co-pending U.S. Appl. No. 12/397,335), dispatched Jul. 12, 2011.

* cited by examiner

DEVICE-SIDE REGISTRATION PROCESSING

PROCESSING FOR LISTING TENTATIVELY-REGISTERED CONTENT

PROCESSING FOR LISTING KEYWORD CANDIDATES

FIG. 10

CONTENT TABLE

| CONTENT ID | PATH | TYPE | DATE AND TIME OF ACQUISITION | NUMBER OF PAGES | REGISTRATION FLAG |
|---|---|---|---|---|---|
| D001 | ¥aa¥bb¥aa1.xxx | T001 | 2008/x1/y1 | 2 | Flag_A |
| D002 | ¥aa¥bb¥aa2.yyy | T002 | 2008/x2/y2 | 4 | Flag_B |
| D003 | ¥aa¥bb¥aa3.xxx | T001 | 2008/x3/y3 | 5 | Flag_A |
| D004 | ¥aa¥bb¥aa4.xxx | T005 | 2008/x4/y4 | 5 | Flag_B |
| D005 | ¥aa¥bb¥aa1.xxx | T007 | 2008/x5/y5 | 1 | Flag_B |
| ... | ... | ... | ... | ... | ... |

FIG. 11

DATA FORMAT TABLE

| DATA FORMAT ID | DATA FORMAT |
| --- | --- |
| T001 | RECEIVED FACSIMILE |
| T002 | TRANSMITTED FACSIMILE |
| T003 | COPY |
| T004 | SCAN |
| T005 | PRINT |
| T006 | RECORDING OF CALL |
| T007 | RECODING OF MESSAGE BY ANSWERING MACHINE |

FIG. 12

KEYWORD TABLE

| KEYWORD ID | KEYWORD | NUMBER OF REFERENCES |
| --- | --- | --- |
| M001 | "PROJECT A" | 22 |
| M002 | "DELIVERY DATE" | 3 |
| M003 | "PLAN" | 44 |
| M004 | "MANAGER" | 2 |
| ⋮ | ⋮ | ⋮ |

FIG. 14

ADDRESS BOOK RELATION TABLE

| ADDRESS ID | NAME | PHONE NUMBER | FACSIMILE NUMBER | NAME OF COMPANY | ADDRESS |
|---|---|---|---|---|---|
| A001 | M0xyx | M0ccc | M0ddd | M0abc | M0zzz |
| A002 | ... | ... | ... | ... | ... |

FIG. 15

TENTATIVELY-REGISTERED CONTENT

| DATE AND TIME | TYPE | CONTENT INFORMATION | |
|---|---|---|---|
| 200x/xx/xx | RECEIVED FAX | COMPANY A | 2 pages |
| 200x/xx/xx | RECEIVED FAX | COMPANY B | 3 pages |
| 200x/xx/xx | PRINT | PC 2 | 1 page |
| 200x/xx/xx | SCAN | PC 2 | 3 pages |

[keypad: 1 2 3 / 4 5 6 / 7 8 9 / * 0 #]

FIG. 16

KEYWORD CANDIDATE

- ☐ PROJECT A
- ☐ DELIVERY DATE
- ☐ MANAGER
- ☐ SCHEDULE

[keypad: 1 2 3 / 4 5 6 / 7 8 9 / * 0 #]

FIG. 17

| SEARCH ATTRIBUTE | SEARCH KEYWORD |
|---|---|
| START DATE AND TIME | ☐ PROJECT A |
| END DATE AND TIME | ☐ PROJECT B |
| TYPE | ☐ COMPANY C |
| KEYWORD | ☐ COMPANY D |

FIG. 18

| RECEIVED FAX | SEARCH RESULT |
|---|---|
| (THUMBNAIL IMAGE) | 200x/xx/xx  RECEIVED FAX |
| | 200x/xx/xx  TRANSMITTED FAX |
| | 200x/xx/xx  PRINT |
| | 200x/xx/xx  RECEIVED FAX |

DEVICE-SIDE SEARCH PROCESSING

CONTENT OUTPUT PROCESSING

KEYWORD ADDITION PROCESSING

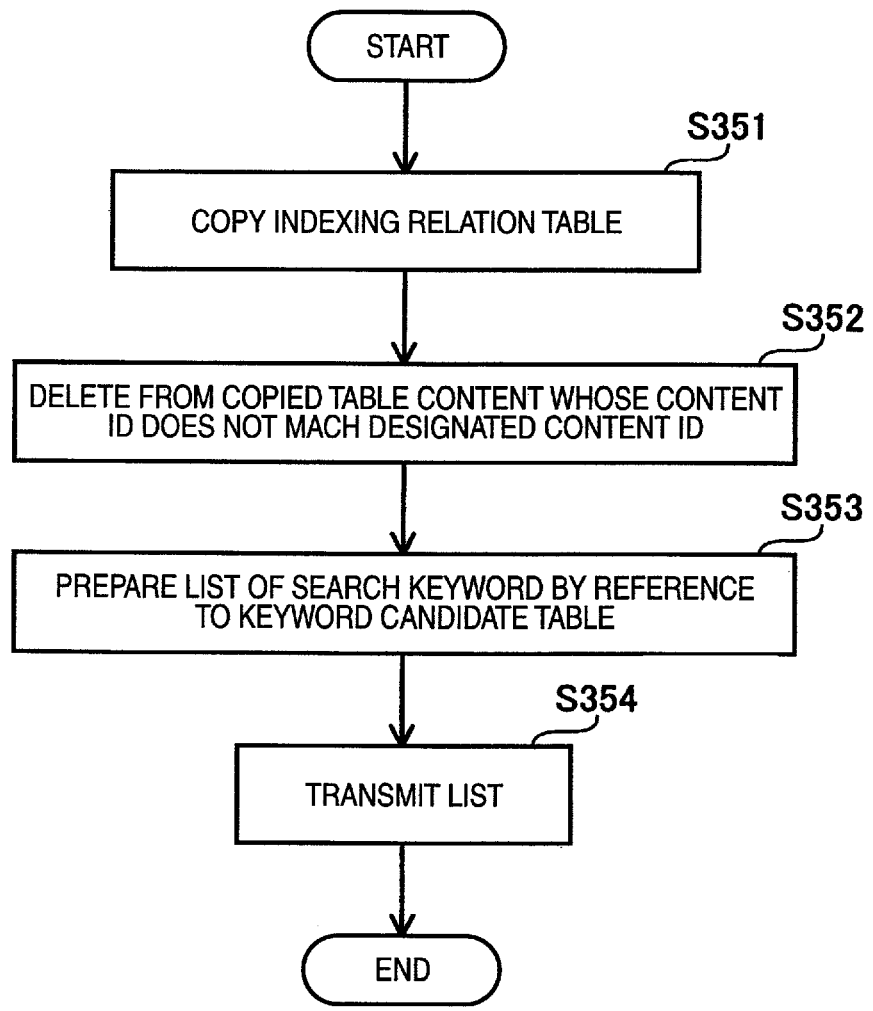

CONTENT MANAGEMENT DEVICE, CONTENT MANAGEMENT SYSTEM, AND CONTENT MANAGEMENT METHOD

CROSS-REFERENCE TO RELATED APPLICATION

This application is a continuation application of U.S. patent application Ser. No. 12/397,335, filed on Mar. 3, 2009, which claims priority from the benefit of Japanese Patent Application No. 2008-083130, filed on Mar. 27, 2008, the disclosures of which are incorporated herein by reference in their entirety.

TECHNICAL FIELD

Aspects of the present invention relate to a content management technique for managing acquired content in a searchable manner, and particularly, to a content management technique that facilitates assignment of a search keyword to a newly acquired content and search of content having already been registered.

BACKGROUND

Recently, various devices, such as a printer and a facsimile, are connected to a network. A printer acquires document data as a target of printing from a terminal. A facsimile acquires facsimile data. Alternatively, if the facsimile has a telephone function, the facsimile may acquire (record) a message of a party on the other end. Hereinafter, document data, facsimile data, and the like, are generically referred to as "content." Devices which acquire content, such as a printer and a facsimile, are generically referred to as "content acquisition device" or "network device".

Acquired content is managed by the network device itself or by a content management device communicably connected to the network device. The "content management device" is hereinafter referred to as a "management device." It is advantageous for the network device or the management device to be able to search for a desired content among a plurality of managed content. In order to search for a desired content, the network device or the management device stores content in association with a keyword for searching purpose. Herein, the keyword for searching purpose is referred to as a "search keyword." The user designates a search keyword in accordance with content.

Japanese Patent Application Publication No. 2005-20256 describes a management device that is easy for the user to designate a search keyword. The management device is connected to an image reader (a kind of network device) through a network. The image reader generates a reduced-size image of received image data (image content) and transmits the image to the management device. The management device extracts a characteristic quantity from the received reduced-size image and extracts candidates for a keyword associated with the reduced-size image in accordance with the characteristic quantity. The thus-extracted candidates for the keyword are sent to the image reader. The image reader displays the keyword candidates. The image reader sends to the management device a candidate designated by the user from among the candidates and acquired image data. The management device stores the keyword candidate designated by the user and the image data in association with each other. That is, the management device stores the keyword candidate designated by the user as a search keyword.

The technique of the Publication makes it easy for the user to designate a search keyword; however, search of image data (image content) is not necessarily easy. If keywords are provided for the user as in a case where a search keyword is designated even when image data are searched, so many keywords are provided for the user. Undesignated keywords as well as the keyword designated by the user in the past are also provided. In this case, it is consumed much time to find a keyword for searching for desired image data from the thus-provided keywords. In other words, providing a plurality of keywords, which may be relevant to content but have never been designated as a search keyword, to the user at the time of search of content assigned the keyword, causes user confusion. There has been a desire for content management technique that facilitates not only designation of a keyword but also search of content with a designated keyword.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a technique for reducing a burden on the user required to conduct a search by providing only the keywords designated by the user in the past.

According to an exemplary embodiment of the present invention, there is provided a content management device for managing acquired content in a searchable manner. The device includes: a storage device that stores a search database in which a plurality of keywords and content are registered; a registration unit that registers new content in the search database; and a search unit that searches content registered in the search database. The registration unit performs operations including: extracting a plurality of keyword candidates associated with the new content from the search database; displaying the extracted keyword candidates; and registering a keyword candidate designated from among the displayed keyword candidates in the search database, as a search keyword in association with the new content. The search unit performs operations including: displaying a plurality of search keywords registered in the search database; extracting content associated with a search keyword designated from among the displayed search keywords from the search database; and displaying the extracted content.

According to another exemplary embodiment of the present invention, there is provided a content management system including: a content acquisition device that acquires content; and a management device that is communicably connected to the content acquisition device and that manages the content in a searchable manner. The content acquisition device includes a first registration unit that registers new content in a search database and a first search unit that searches content registered in the search database. The management device includes: a second registration unit that operates in cooperation with the first registration unit; and a second search unit that operates in cooperation with the first search unit. The first registration unit performs the following operations including:

(1) transmitting the new content to the management device;

(2) receiving a content ID for identifying the new content and a plurality of keyword candidates for searching the new content from the management device;

(3) displaying the received keyword candidates; and (4) transmitting a keyword candidate designated from among the displayed keyword candidates and the content ID received by the operation (2) to the management device.

The second registration unit performs the following operations including:

(a) receiving the new content from the content acquisition device;

(b) generating the plurality of keyword candidates based on the received new content;

(c) associating the received new content with the generated keyword candidates and generating the content ID for identifying the new content;

(d) transmitting the content ID and the generated keyword candidates to the content acquisition device;

(e) receiving the designated keyword candidate and the content ID from the content acquisition device, and (f) registering the designated keyword candidate as a search keyword in the search database in association with content identified by the content ID received through the operation (e).

The first search unit performs the following operations including:

(5) issuing a search keyword request for searching registered content to the management device;

(6) receiving a plurality of search keywords from the management device, (7) transmitting a search keyword designated from among the received search keywords to the management device;

(8) receiving content associated with the designated search keyword from the management device, and (9) displaying the received content.

The second search unit performs the following operations including:

(g) transmitting the search keywords registered in the search database to the content acquisition device in response to the search keyword request from the content acquisition device, (h) extracting content associated with the designated search keyword from the search database; and (i) transmitting the extracted content to the content acquisition device.

According to another exemplary embodiment of the present invention, there is provided a method for managing acquired content in a searchable manner. The method includes:

extracting a plurality of keyword candidates associated with a new content from a search database;

displaying the extracted keyword candidates;

registering a keyword candidate designated from among the displayed keyword candidates in the search database as a search keyword in association with the new content;

displaying a plurality of search keywords registered in the search database;

extracting content associated with a search keyword designated from among the displayed search keywords from the search database; and displaying the extracted content.

According to the above-described configuration, designation of a keyword and search of content with a designated keyword can be facilitated.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 10 shows an example of a content table;

FIG. 11 shows an example of a data format table;

FIG. 12 shows an example of a keyword table;

FIG. 14 shows an example of an address book relation table;

FIG. 15 shows an exemplary indication on an MFD;

FIG. 16 shows an exemplary indication on the MFD;

FIG. 17 shows an exemplary indication on the MFD;

FIG. 18 shows an exemplary indication on the MFD;

FIG. 25 shows a flowchart of additional keyword listing processing.

DETAILED DESCRIPTION

A content management system of an exemplary embodiment will be described by reference to the drawings.

1. System Configuration

Figure 1:
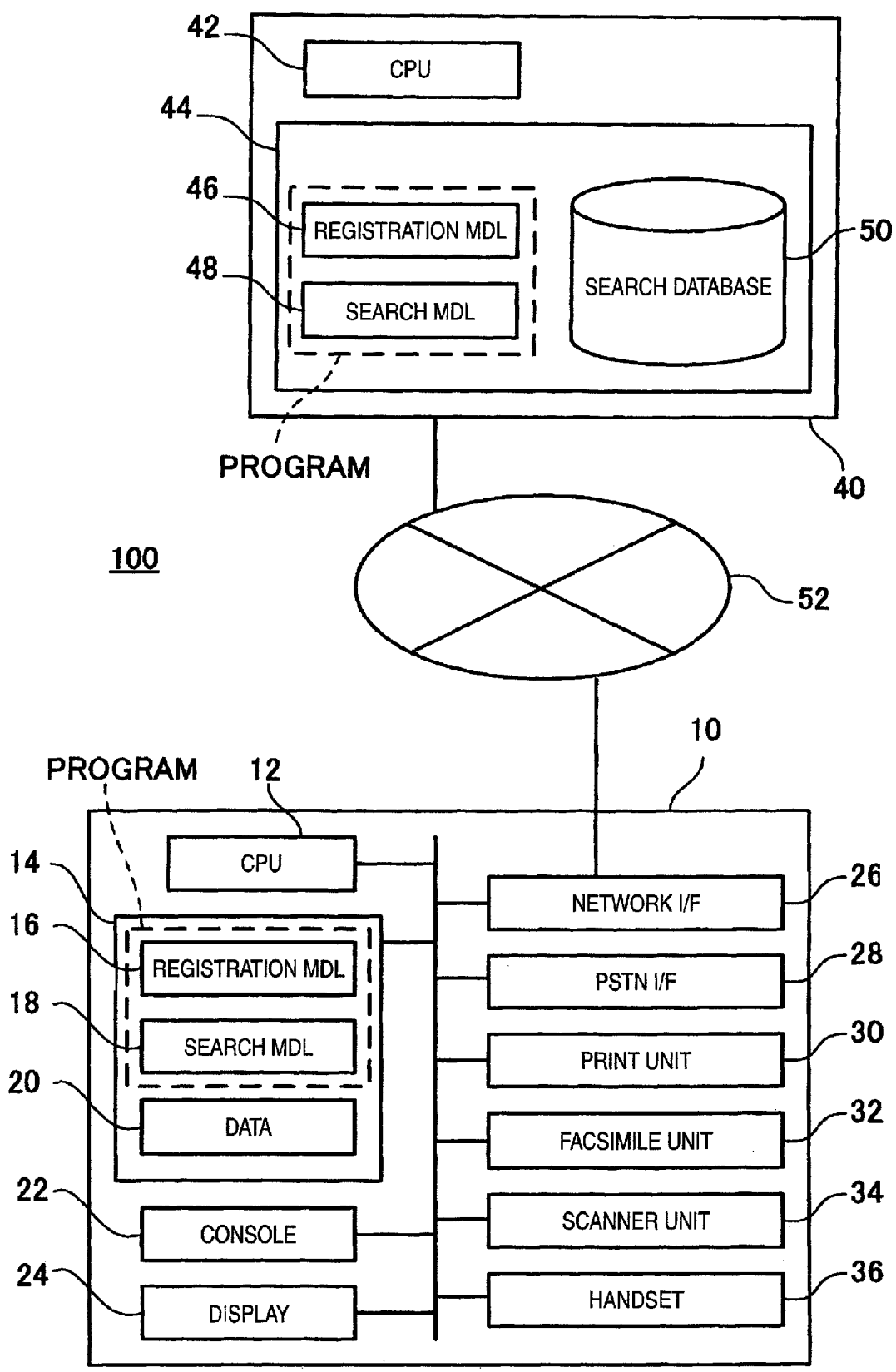
FIG. 1 is a block diagram of a data management system.

FIG. 1 is a block diagram of a content management system 100. The content management system includes a server 40 (a management device) and an MFD 10 which are connected to a network 52, respectively. The MFD 10 is a so-called multifunction device having a print function, a facsimile function, a scanner function, and a telephone function. The server 40 and the MFD 10 can communicate with each other through the network 52.

The MFD 10 has a CPU 12, a storage 14, a console 22, a display 24, a network interface 26, a public switched telephone network (PSTN) interface 28, a print unit 30, a facsimile unit 32, a scanner unit 34, and a handset 36. In FIG. 1, "I/F" and "MDL" signify "interface" and "module," respectively.

The CPU 12 controls the MFD 10 in accordance with various programs stored in the storage 14. The programs stored in the storage 14 include a registration module 16 and a search module 18. Processing described by the respective programs will be described later. Various sets of data 20 are stored in the storage 14.

The console 22 is hardware to be operated by the user. The user operates the console 22, thereby inputting a desired instruction into the MFD 10.

The network interface 26 is hardware for establishing communication with a server 40 through a network 52. The PSTN interface 28 is hardware that connects the MFD 10 to a public line (not shown). The MFD 10 exchanges phone or facsimile data through the public line.

The print unit 30 is hardware for print function. The facsimile unit 32 is hardware for facsimile function. The scanner unit 34 is hardware for scanner function. The handset 36 is hardware for phone function.

The MFD 10 can receive content from a terminal connected to the network 52 and print the content. The MFD 10 can receive and transmit facsimile content. The MFD 10 can read a text and an image printed on a sheet. The MFD 10 can print the thus-read text and image. Specifically, the MFD 10 can perform copy function by use of the scanner unit 34 and the print unit 30. The MFD 10 can record phone conversation voice. That is, the MFD 10 can acquire print data (print content), scanned data (scanned content), facsimile data (facsimile content), phone conversation data (voice content), and the like.

Herein, document data, facsimile data, and the like, are generically referred to as "content." That is, content managed by a network device or a management device are not limited to image content. The content may be in any format, so long as this is acquired by the network device (a content acquisition device).

A group of functions of the MFD 10 can be coarsely grouped into two types of functions. One is function (automatic acquisition function) with which the MFD 10 automatically acquires content regardless of user operation. Receipt of facsimile content, recording performed by a telephone answer machine (automatic recording of voice content), printing (acquisition of print content) instructed by an external device (e.g., a personal computer connected through the network) belong to the automatic acquisition function. The other is function (manual acquisition function) with which the MFD 10 acquires content in response to user operation. To be more precise, the function is to start processing for acquiring content in response to operation of the console 22 performed by the user. The manual acquisition function includes copy, scan and transmission of facsimile content, and recording of conversation.

The server 40 has a CPU 42 and a storage 44. The storage 44 stores as programs a registration module 46 and a search module 48. The storage 44 further stores a search database 50 in which a plurality of content acquired by the MFD 10 are registered in a searchable manner.

Content acquired by the MFD 10 is transmitted to and managed by the server 40. The server 40 registers the content in the search database 50. Each of the content is, at that time, associated with a keyword for searching purpose (a search keyword). Specifically, a data management system 100 associates the content acquired by the MFD 10 with a search keyword and registers the content and the keyword in the search database 50. The registration module 16 of the MFD 10 and the registration module 46 of the server 40 register the content and the search keyword while cooperating with each other. The registration module 16 of the MFD 10 is referred to as a device-side registration module 16, and the registration module 46 of the server 40 is referred to as a server-side registration module 46.

The user can designate a search keyword. The device-side registration module 16 and the server-side registration module 46 provide an environment that enables the user to readily designate a search keyword while cooperating with each other.

2. Keyword Registration Processing

Processing performed by the content management system 100 is described. Keyword registration processing for associating the content acquired by the MFD 10 with a search keyword desired by the user will first be described.

The content management system 100 performs processing for a case where content is acquired in response to user operation and another processing for a case where content is automatically acquired. At first, a processing flow of the data management system 100 for a case where content is acquired in response to user operation will be described.

Figure 2:
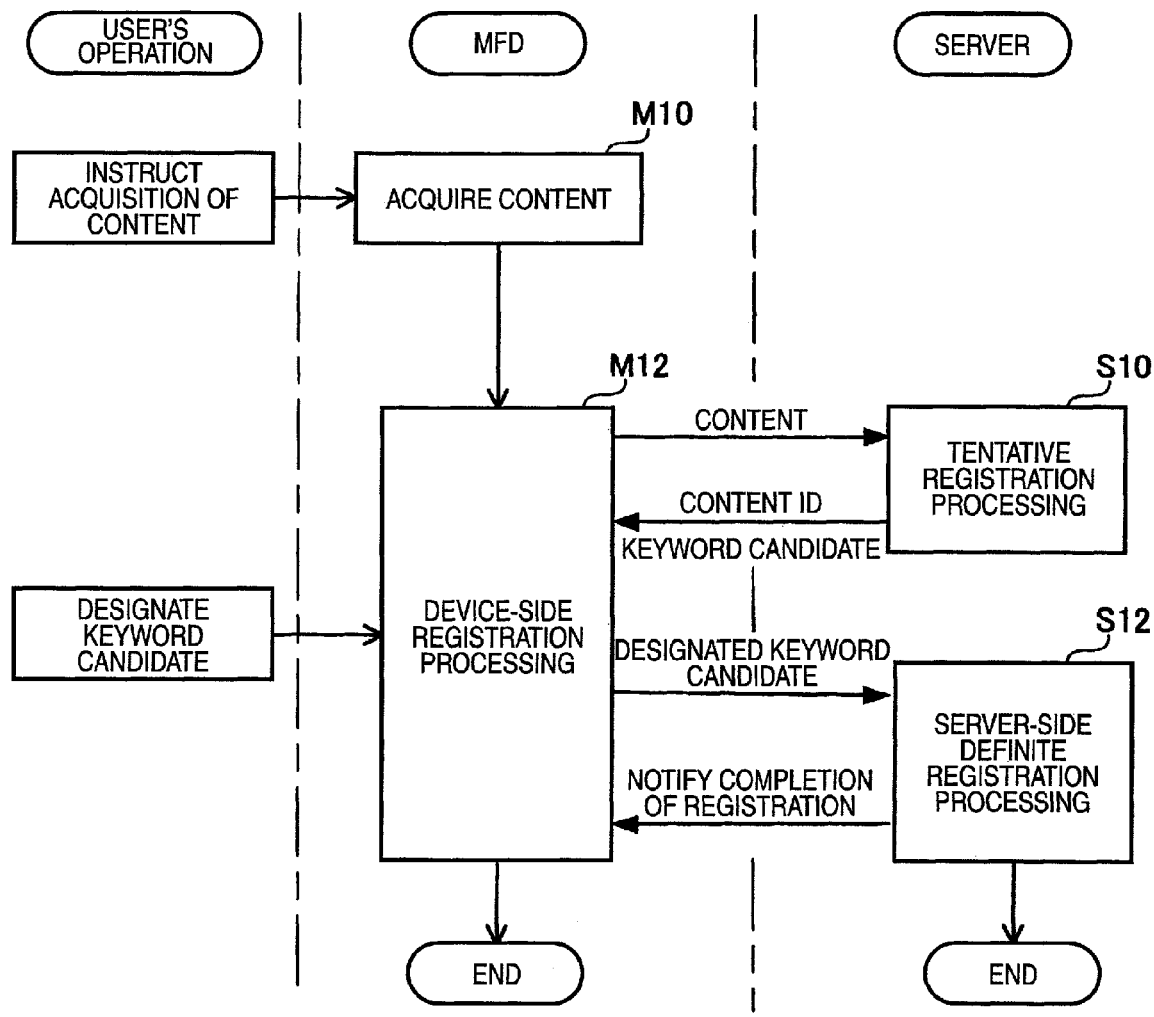
FIG. 2 shows an overall flow of keyword registration processing of the system.

FIG. 2 is an overall processing flow of the data management system 100 for a case where content is acquired in response to user operation. FIG. 2 shows user operation on the left side, processing of the MFD 10 in the center, and processing of the server 40 on the right.

The MFD 10 acquires content in response to a user instruction (step M10). For instance, a file designated by the user is printed in answer to a print instruction from the user. Alternatively, data designated by the user are transmitted by facsimile in response to an instruction for facsimile transmission from the user. Subsequently to content acquisition processing (step M10), the MFD 10 commences device-side registration processing (M12) for associating the acquired content with a search keyword. In response to the device-side registration processing, the server 40 performs tentative registration processing (S10) and server-side definite registration processing (S12). The tentative registration processing and the server-side definite registration processing are sub-modules of the server-side registration processing.

The tentative registration processing (S10) is processing for assigning a content ID to the content acquired by the MFD 10 and generating keyword candidates for the content. Specifically, the tentative registration processing includes receiving content from the MFD 10 and transmitting a keyword candidate and a content ID, which are generated based on the received content, to the MFD 10. A "nonregistration list" is generated through the tentative registration processing. The "nonregistration list" shows content for which the user has not yet designated a search keyword. In other words, the tentative registration processing is processing for storing content unassigned a search keyword while distinguished from content that has been already assigned a search keyword.

The Server-side definite registration processing (S12) is processing for assigning a search keyword to a tentatively-registered content. Specifically, the server-side definite registration processing includes receiving a keyword candidate designated by the user and registering the candidate in the search database in association with the content.

The Device-side registration processing (M12), the tentative registration processing (S10), and the server-side definite registration processing (S12) will be described hereunder, respectively.

(Device-Side Registration Processing)

Figure 3:
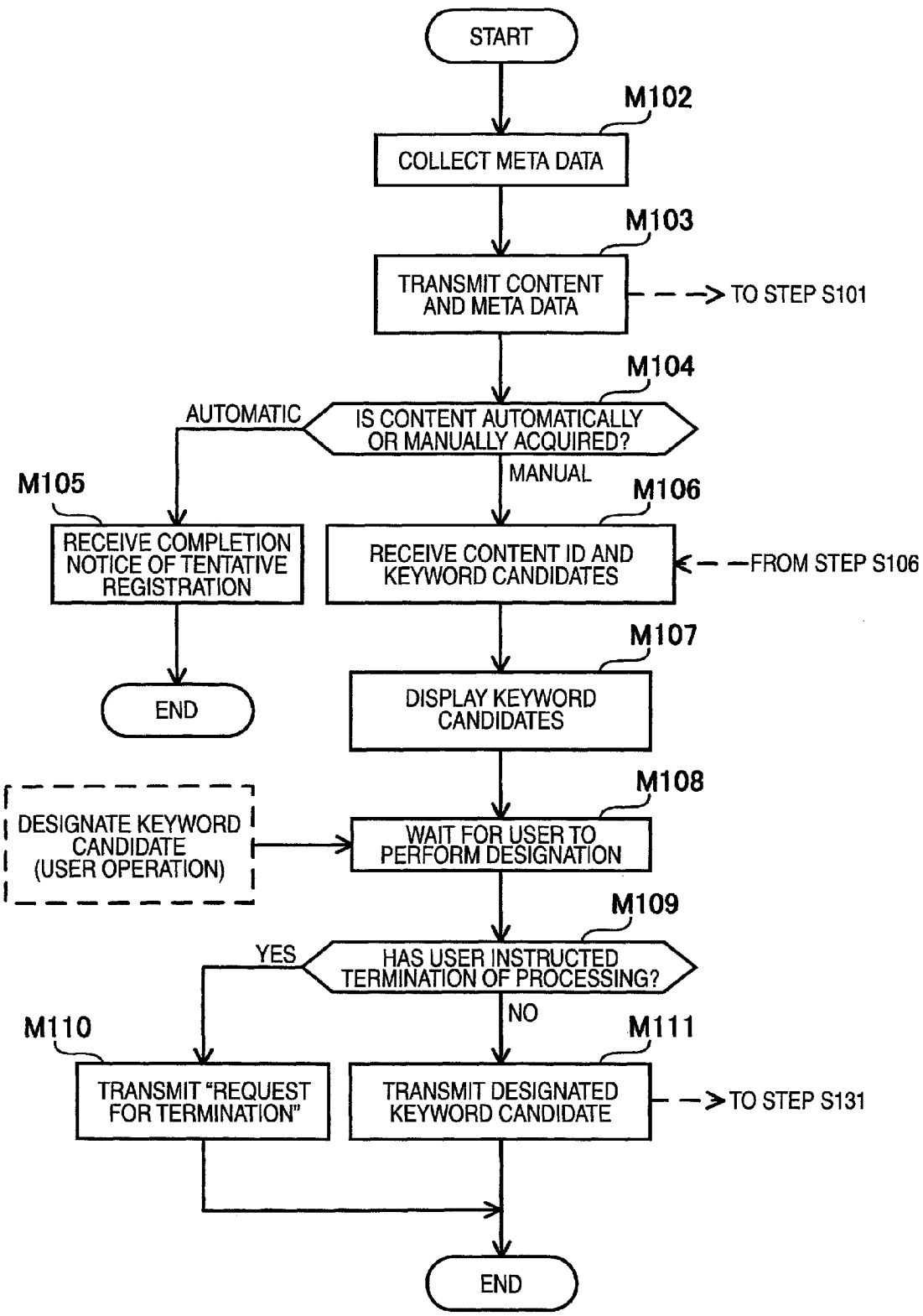
FIG. 3 is a flowchart of device-side registration processing.

FIG. 3 shows a flowchart of device-side registration processing.

After acquiring content, the MFD 10 collects meta data (M102). Meta data is data that is generated along with operation for acquiring the content and varies according to a path along which the content is acquired.

The following kinds of meta data are considered. A left-side word represents a path along which content is acquired, and a right-side word represents meta data.

Facsimile receipt: a date and time of receipt, a phone number of a source, and a destination F code Facsimile transmission: a date and time of transmission, a phone number of a destination, and a destination F code Copy: a date and time of copying Scan: a date and time of scanning Print: a date and time of printing, the name of a terminal, a user account, and the name of a document In addition to the above, the number of pages of content, a date and time of phone conversation, a date and time of an incoming call, and an acquisition path are also included in meta data.

The MFD 10 transmits the thus-acquired content and the collected meta data to the server 40 (M103). Upon receipt of the content and the meta data (S101 in FIG. 4), the server 40 generates a content ID and keyword candidates and transmits the content ID and the keyword candidates to the MFD 10 (S106 in FIG. 4). Processing of the server 40 will be described later.

In step M104, it is determined whether the content is automatically acquired. If the content is automatically acquired ("automatic": step M104), the MFD 10 receives a notice showing "completion of tentative registration" from the server 40 and terminates registration processing. Registration processing for the case of automatic acquisition of content will be described later. The determination as to whether acquisition of content is automatic or manual is made based on a path along which the content is acquired included in meta data.

If acquisition of the content is "manual" (namely, if the MFD 10 acquires the content in response to user operation), the MFD 10 awaits until a content ID and keyword candidates are received from the server 40 (M106).

The MFD 10 displays the received keyword candidates on the display 24 (M107) and waits for the user to designate one among the keyword candidates (M108). The user operates the console 22, to thus designate a keyword candidate desired to be associated with the acquired content from among the displayed candidates.

Upon receipt of a result of designation performed by the user, the MFD 10 transmits the thus-designated keyword candidate to the server 40 (M111) and terminates device-side registration processing.

If the user instructs halt of processing (YES in M109), a "request for halt" is transmitted to the server 40, and processing is terminated (M110).

(Tentative Registration Processing Performed by the Server)

Figure 4:
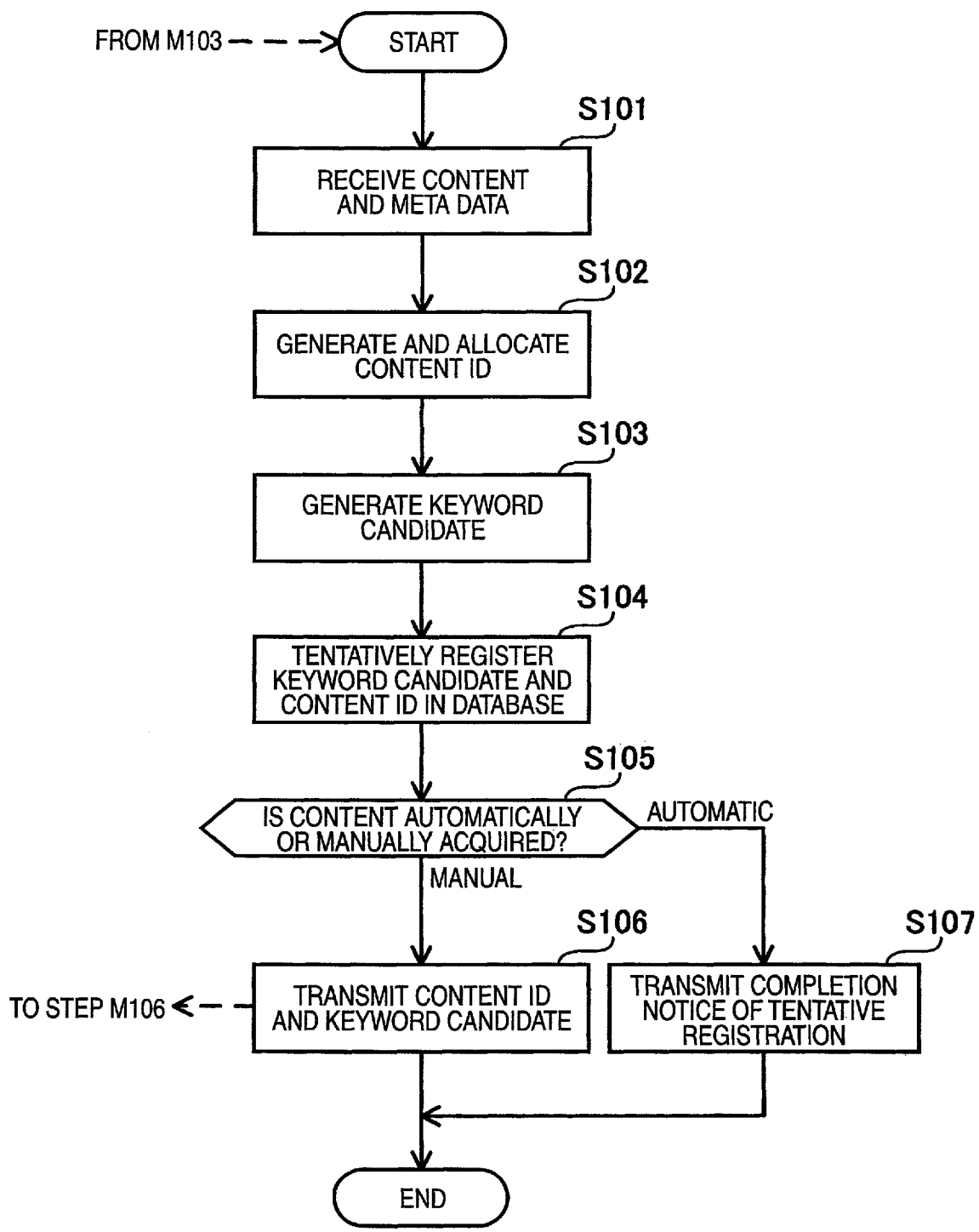
FIG. 4 shows a flowchart of tentative registration processing.

In response to step M103 of the device-side registration processing, the server 40 commences the tentative registration processing. FIG. 4 shows a flowchart of the tentative registration processing.

The server 40 first receives content and meta data (S101).

The server 40 generates a content ID and associates the content ID with the received content (S102). The content ID is uniquely assigned to the received content.

Subsequently, the server 40 generates candidates for a keyword from the received content and the meta data (S103). The server 40 adopts elements (an acquisition path, a date and time, a destination F code, and the like) of the received meta data as keyword candidates.

The server 40 extracts keyword candidates for the received content from among the keyword candidates of the past in the search database, as well as newly generating a keyword candidate. As will be described in the following, the candidates for a keyword generated in the past are accumulated in the search database. The server 40 extracts keywords associated with the received meta data from among the keyword candidates of the past accumulated in the search database and adopts the thus-extracted keywords as keyword candidates for the received content. For instance, when the meta data received in the past include a phone number of a facsimile, there is a case where the name of a company having that facsimile number is accumulated in the search database as a keyword candidate. When newly-received meta data include the phone number of the facsimile, the server 40 extracts the name of the company having the facsimile number from the search database and adopts the thus-extracted name as a keyword candidate for the newly-received content.

At the same time, the server 40 extracts words from the content and adopts the thus-extracted words as keyword candidates. For instance, when the content is image data, words are extracted by means of an Optical Character Reader (OCR). When the content is audio data, words are extracted by means of voice recognition processing. The server 40 subjects the thus-extracted words to statistical processing and adopts words extracted in the past at high frequency as keyword candidates.

The server 40 tentatively registers, in a search database, the content, the keyword candidates generated from the content and meta data, and a content ID in an associated with one another (S104). Specifically, the server 40 tentatively registers the content, the keyword candidates associated with the content, and the content ID in the search database in the form of one record, and sets a flag showing tentative registration on the record. The flag representing tentative registration is also included in the record. A specific configuration of the search database will be described later.

If the content is manually acquired (if the processing proceeds to "manual" at step S105), the server 40 transmits the content ID and the keyword candidates to the MFD 10 (S106). If the content is automatically acquired, a notice showing "completion of tentative registration" is transmitted to the MFD 10 (S107). The determination as to whether the content is automatically acquired or manually acquired is made based on the acquisition path included in the meta data.

(Server-Side Definite Registration Processing)

Figure 5:
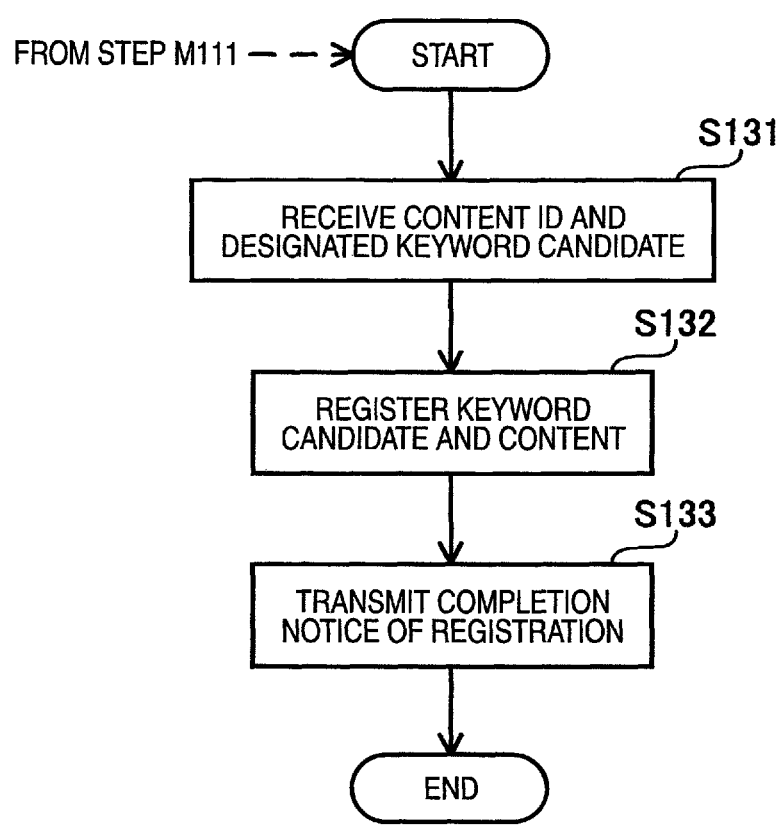
FIG. 5 shows a flowchart of server-side definite registration processing.

FIG. 5 shows a flowchart of the server-side definite registration processing. If the content is manually acquired, the content ID and the keyword candidate designated by the user are transmitted from the MFD 10 (step M111 in FIG. 3). In response to step M111, the server 40 commences the server-side definite registration processing. The server 40 first receives the content ID and the keyword candidate designated by the user (S131). The server 40 associates the content identified by the received content ID with the designated keyword candidate as a search keyword. The server 40 registers the associated keyword candidate in the search database as a search keyword (S132). The content and a search keyword for the content are registered in the search database. Specific registration of the search keyword is as follows. The keyword candidates have been already tentatively registered in the search database. Flags showing registration statuses are assigned to respective keyword candidates. A "tentative registration" flag is set at the time of tentative registration. When the keyword candidate designated by the user is registered as a search keyword, the flag of the keyword candidate is changed from "tentative registration" to "definite registration." Specifically, the keyword on which the "tentative registration" flag is set is identified as a "keyword candidate,"

and a keyword on which the "definite registration" flag is set is identified as a "search keyword."

The content on which the "tentative registration" flag is set and a keyword candidate are extracted from the search database, whereby the above-described "nonregistration list" is obtained.

Finally, the server 40 transmits a "registration completion" notice to the MFD 10, and then the processing is terminated (S133).

(Registration Processing for the Case of Automatic Acquisition of Content)

Figure 6:
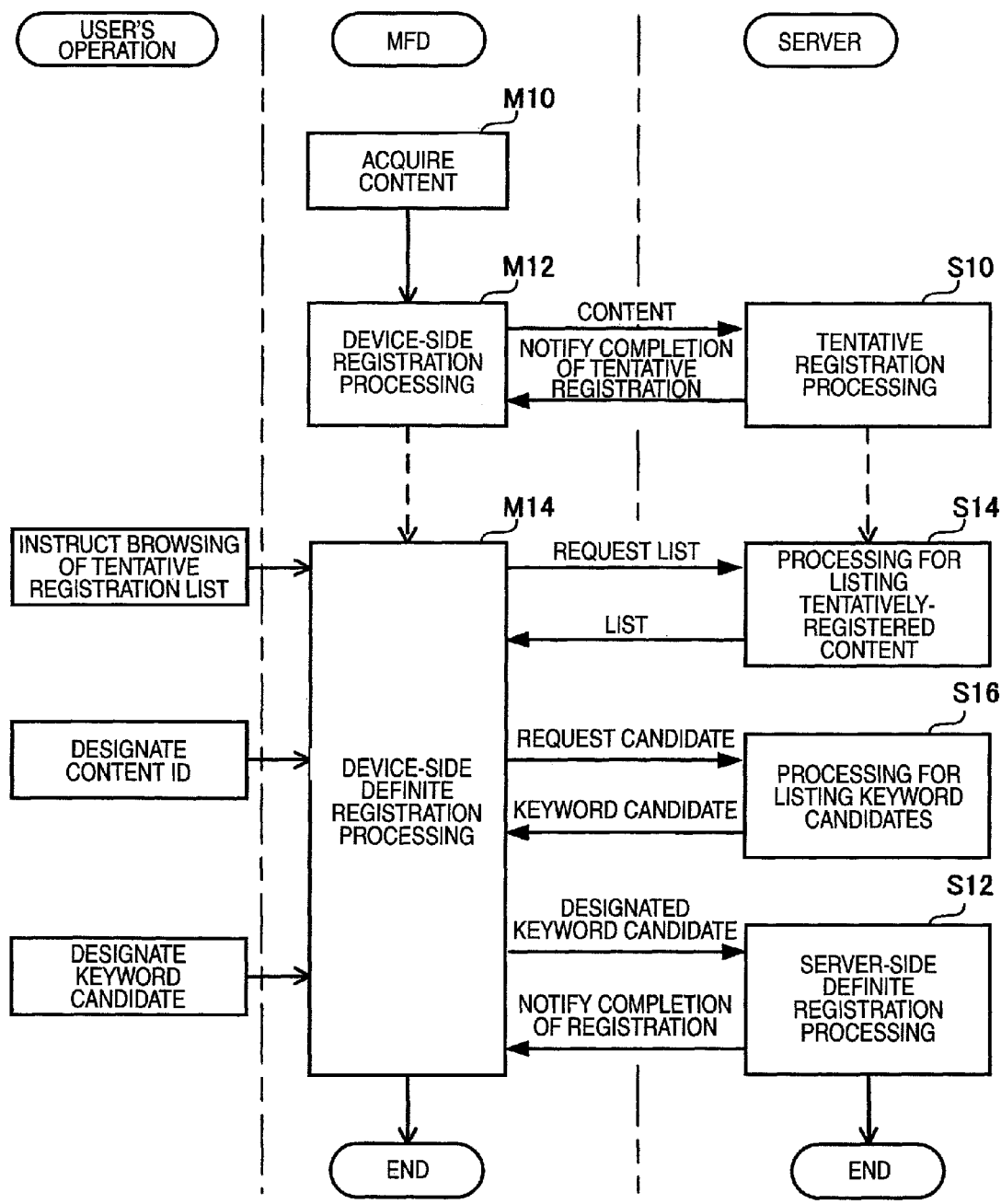
FIG. 6 shows a flow of system processing achieved when a content is automatically acquired.

FIG. 6 shows an overall flow of processing of the system performed in the case of automatic acquisition of content. If content is automatically acquired, the tentative registration processing and the definite registration processing are independently performed at separate timing. When the MFD 10 acquires content (M10), the tentative registration processing is performed between the MFD 10 and the server 40. The MFD 10 performs the device-side registration processing shown in FIG. 3, wherein the processing proceeds to "automatic" at step M104. Consequently, the MFD 10 receives a notice of "tentative registration completion" from the server 40 and completes device-side registration processing (M105).

In the meantime, the server 40 performs the tentative registration processing shown in FIG. 4, wherein the processing proceeds to "automatic" at step S105. Therefore, the server 40 transmits a notice of "tentative registration completion" and completes the tentative registration processing (S107).

When the user inputs an instruction for browsing a tentative registration list after acquisition of content, the MFD 10 performs the device-side definite registration processing (M14). The device-side definite registration processing is a sub-module of the device-side registration module 16. The "tentative registration list" is synonymous with "unregistered content."

In response to the device-side definite registration processing (M14), the server 40 performs processing for listing tentatively-registered content (S14), processing for listing keyword candidates (S16), and the server-side definite registration processing. These processing are sub-modules of the server-side registration module 46. During the processing for listing tentatively-registered content (S14), the server 40 transmits content IDs showing the tentatively-registered content in response to the "request for a tentative registration list" from the MFD 10. The server 40 may also add meta data to the content IDs so as to make it easy for the user to identify the content. A configuration for transmitting meta data to the MFD 10 along with a content ID will be described hereunder. During the processing for listing keyword candidates, the server 40 transmits keyword candidates in response to the "request for a candidate" from the MFD 10. During the device-side definite registration processing (M14), the MFD 10 displays keyword candidates, receives designation of keyword candidates performed by the user, and transmits the thus-received keyword candidates to the server 40. During the server-side definite registration processing (S12), the server 40 receives the designated keyword candidates from the MFD 10 and notifies completion of registration of the designated keyword candidates.

The device-side definite registration processing (M14), the processing for listing tentatively-registered content (S14), and the processing for listing keyword candidates (S16) will be described more specifically.

(Device-Side Definite Registration Processing)

Figure 7:
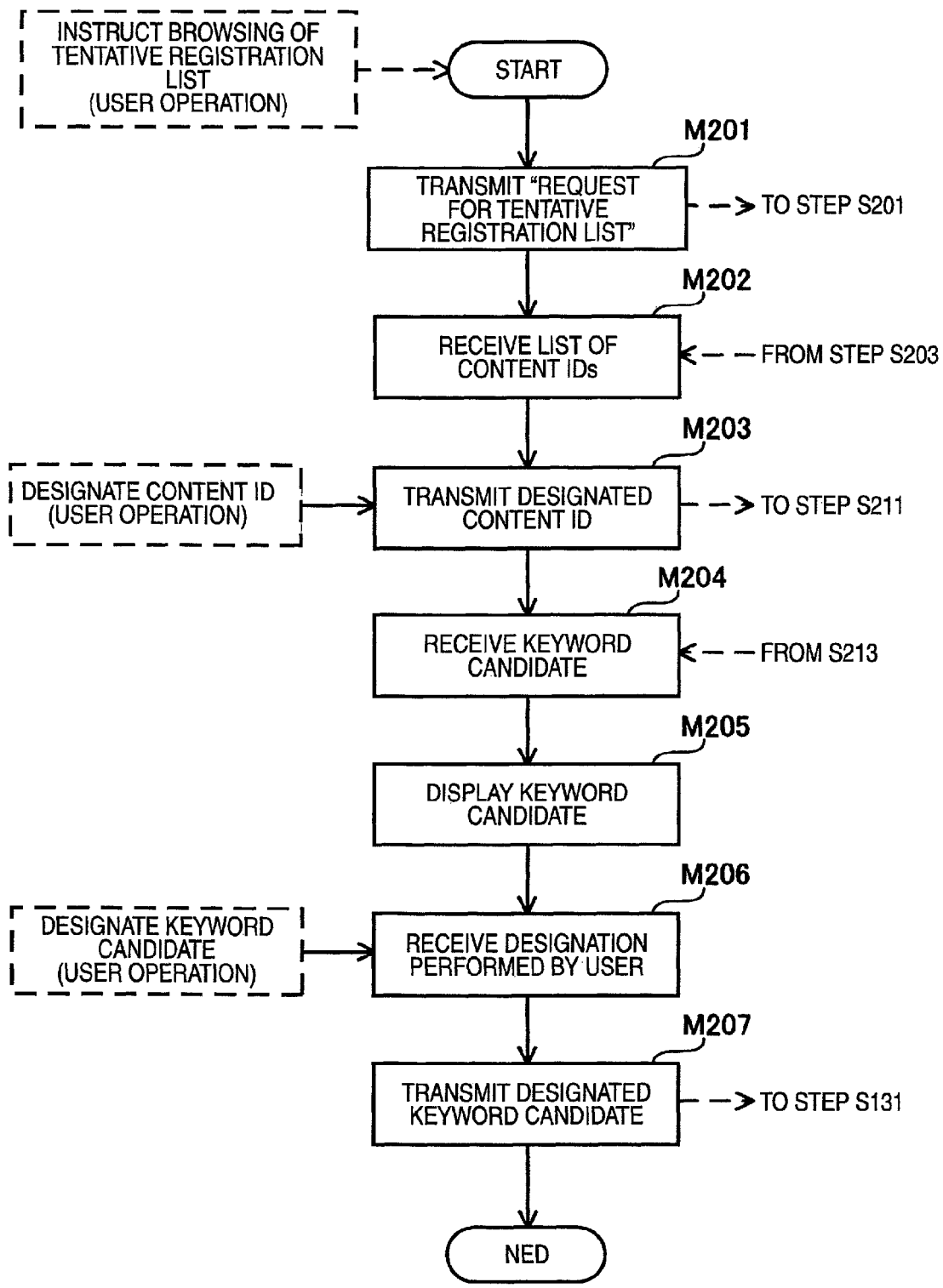
FIG. 7 shows a flowchart of device-side definite registration processing.

The user instructs the MFD 10 to browse the tentative registration list by operating the console 22, whereupon the device-side definite registration processing is initiated. FIG. 7 shows a flowchart of the device-side definite registration processing. In response to the browsing instruction issued by the user, the MFD 10 transmits a "request for a tentative registration list" to the server 40 (M201). In response to the "request for a tentative registration list," the server 40 transmits a group of content IDs for content which have not yet finished undergoing designation of a search keyword (a list of content IDs). Upon receipt of a list of content IDs (M202), the MFD 10 displays a group of received content IDs and waits for the user to perform designation. The user designates a content ID that identifies content for which a search keyword is desired to be designated. Upon receipt of any designated content ID from the user, the MFD 10 transmits the received content ID (a content ID designated by the user) and the "request for a candidate" to the server 40 (M203). In response to the "request for a candidate," the server 40 transmits keyword candidates associated with the content identified by the designated content ID. The MFD 10 receives the keyword candidates (M204). Next, the MFD 10 displays the thus-received keyword candidates (M205) and waits for the user to designate a keyword candidate. The user designates, from among the displayed keyword candidates, a keyword candidate desired to be associated with the acquired content by operating the console 22. The user can designate (select) a plurality of keyword candidates. The MFD 10 receives a keyword candidate designated by the user (M206). It is noted that the MFD 10 can receive a plurality of keyword candidates at this time. Upon receipt of a result of designation performed by the user, the MFD 10 transmits the designated keyword candidate to the server 40 (M207).

(Processing for Listing Tentatively-Registered Content)

Figure 8:
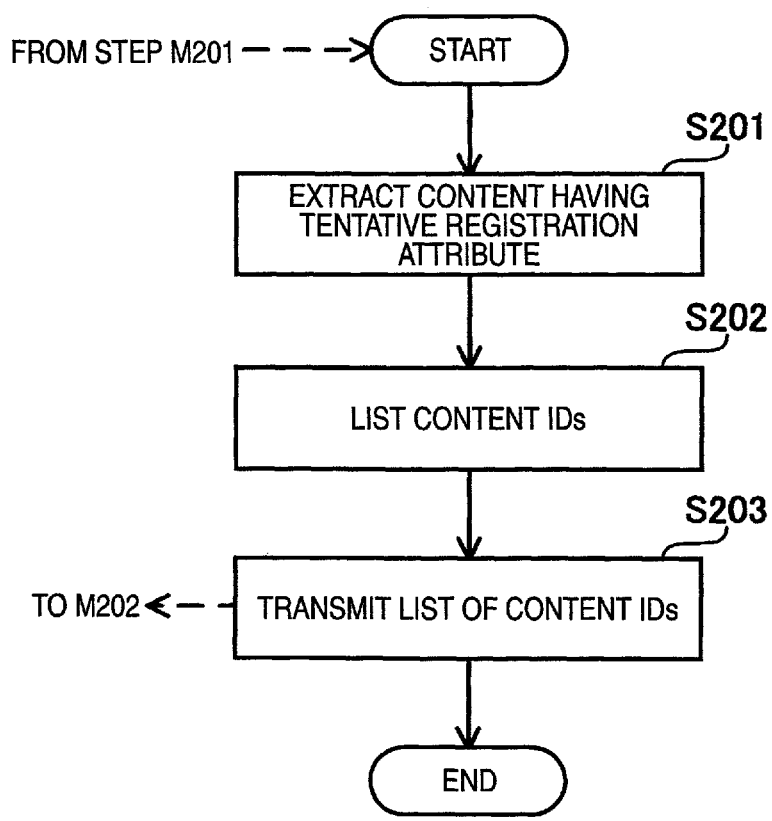
FIG. 8 shows a flowchart of processing for listing tentatively-registered content.

FIG. 8 shows a flowchart of the processing for listing tentatively-registered content to be performed by the server 40. In response to the "request for a tentative registration list" (M201), the server 40 commences listing processing. The server 40 first extracts content having an attribute of tentative registration from the search database (S201). Specifically, the server 40 extracts, from the search database, content on which a flag showing tentative registration is set. The server 40 lists content IDs of the extracted content (S202). The server 40 transmits listed content IDs and meta data to the MFD 10 (S203).

(Processing for Listing Keyword Candidates)

Figure 9:
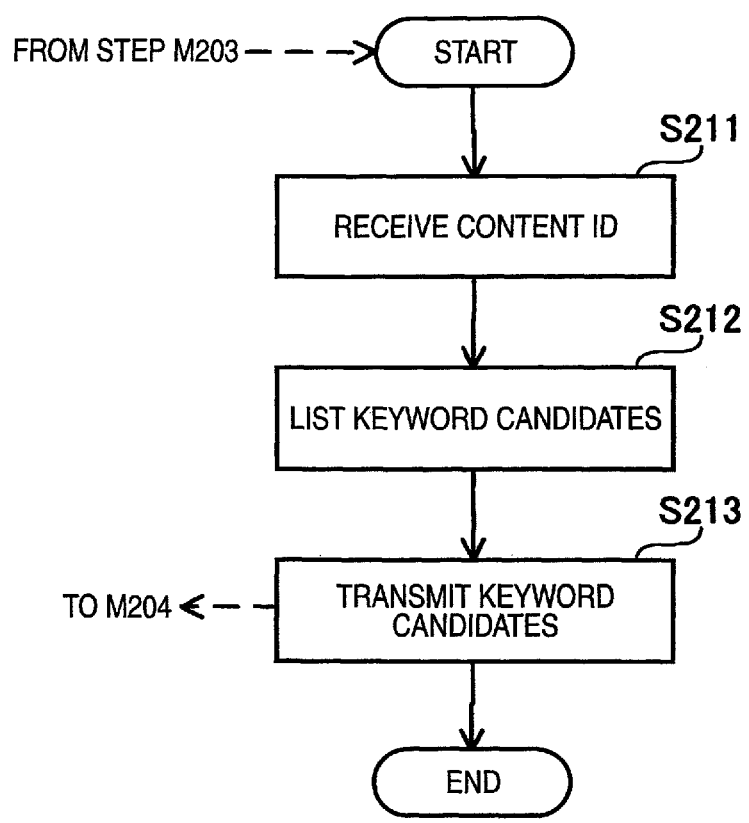
FIG. 9 shows a flowchart of processing for listing keyword candidates.

FIG. 9 shows a flowchart of the processing for listing keyword candidates to be performed by the server 40. The server 40 first receives a "request for a candidate" and a content ID from the MFD 10 (S211). In response to the "request for a candidate," the server 40 extracts keyword candidates for the content identified by the received content IDs from the search database (S212). The server 40 sends the thus-extracted keyword candidates to the MFD 10 (S213).

As described above, when content is automatically acquired, the content management system 100 displays a list of unregistered content (a nonregistration list) in response to the instruction from the user after the tentative registration. The user can designate desired content from the list and designate a search keyword for the content.

(Configuration of Database)

Figure 13:
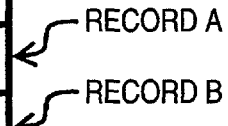
FIG. 13 shows an example of an indexing relation table.

The configuration of the search database will now be described. The search database includes several mutually-related tables (a content table, a data format table, a keyword table, a relation table for indexing, and an address book relation table). FIG. 10 shows an example of the content table. FIG. 11 shows an example of the data format table. FIG. 12 shows an example of the keyword table. FIG. 13 shows an example of the indexing relation table. FIG. 14 shows an example of the address book relation table.

The content table has items pertaining to a content ID, a path, a type, a date and time of acquisition, the number of pages, and a registration flag. An item pertaining to a path describes a location where an acquired content file is stored.

An item pertaining to a content ID describes a content ID generated by the server 40. When registering acquired content in the content table, the server 40 registers a generated content ID in association with the content.

An item pertaining to a type describes a path along which content is acquired. The type is represented by a code. Correspondence between respective type codes and acquisition paths is defined by a data format table. For instance, type code "T001" represents that content is acquired by means of facsimile receiving operation. As shown in FIG. 10, a type code "T001" is set for content whose content ID is "D001." That is, the type code shows that content identified by content ID "D001" is acquired by means of facsimile receiving operation.

An item pertaining to a date and time of acquisition describes a date and time at which content is acquired. An item pertaining to the number of pages describes the number of pages of content.

In an item pertaining to a registration flag, there is set a flag for identifying whether or not a search keyword of content has been already registered. Flag "Flag_A" shows that a search keyword is not registered. Flag "Flag_B" shows that a search keyword is registered. That is, "Flag_A" shows that registered content is in the state of tentative registration. An unregistered content is listed by extracting content for which "Flag_A" is set from the content table.

Keywords generated in the past are registered in the keyword table. The respective keywords are assigned keyword candidate IDs for identifying the keywords. There is a case where a single keyword candidate is generated from a plurality of content. An item pertaining to the number of references in the keyword table describes the number of content associated with each of keywords.

The indexing relation table describes an association between each content and a keyword for the content. For instance, content identified by the content ID "D001" is associated with a keyword identified by the keyword ID "M001." A reference attribute indicates a flag showing whether a keyword is definitely or tentatively registered as a search keyword with regard to the content of the content ID. The "Flag_A" shows that a keyword is not definitely but tentatively registered with regard to a content ID; namely, that a keyword is in the state of a candidate. The "Flag_B" shows that a keyword is registered as a search keyword. For instance, the "Flag_A" is set in a field of the content ID "D001" and a field of a keyword ID "M001." The "Flag_A" shows that the keyword of the keyword ID "M001" is a keyword for content of the content ID "D001." Likewise, the table in FIG. 13 shows that a keyword having a keyword ID "M003" corresponds to a search keyword for content having a content ID "D002."

The address book relation table associates so-called address data (a name, a phone number, a facsimile number, the name of a company, and an address) with an ID (an address ID).

Next, exemplary indications on the display 24 of the MFD 10 is shown. FIG. 15 shows an exemplary indication of a nonregistration list received in step M202. Subsequent to step M202, content information, the date and time of acquisition, and an acquisition path (a type) for content whose search keyword is not registered (content in the nonregistration list) are displayed.

When the user designates any one of content from the list displayed in FIG. 15, keyword candidates associated with the designated content are displayed. FIG. 16 shows an exemplary display of a list of keyword candidates. When the user designates any one of keyword candidates from the displayed keyword candidates, the designated keyword candidate is registered as a search keyword. In FIG. 16, a square shape provided on the left of each of the keyword candidates represents a check box. The user can simultaneously designate a plurality of keyword candidates by marking a plurality of check boxes.

FIG. 17 shows an exemplary indication of a search screen. When the user designates a "keyword" from search attributes, search keywords registered in the past are displayed. When the user designates a desired search keyword from among the displayed search keywords, content associated with the designated search keyword are extracted, and a list of the thus-extracted content is displayed. A square shape provided on the left of each of the search keywords in FIG. 17 also represents a check box. The user can simultaneously designate a plurality of search keywords by marking a plurality of check boxes.

FIG. 18 shows an exemplary indication of the list of the extracted content. When the user designates a desired content from the list, specifics of the content are displayed.

As shown in FIGS. 15 through 18, a ten-key numeric pad is disposed on the left of the display 24. The ten-key numeric pad is a part of the console 22.

The followings are noted with regard to the processing described in the above.

When a "halt" instruction from the user is received in step M109 of device-side registration processing shown in FIG. 3, a content ID and keyword candidates (i.e., "tentatively-registered content") that have been processed are deleted from the MFD 10 and stored in the tentatively-registered state within the server 40. Tentatively-registered content will later become a target of processing (step S201 shown in FIG. 8) for extracting tentatively-registered content in response to the "request for a tentative registration list" from the MFD 10. Alternatively, tentatively-registered content ID may also be stored in the MFD 10. In this case, the MFD 10 can display a list of tentatively-registered content without performing processing pertaining to steps M201 and M202 shown in FIG. 7.

3. Search Processing

Processing for searching content registered in the search database will now be described.

(Overall Flow of Processing of the Data Management System 100)

Figure 19:
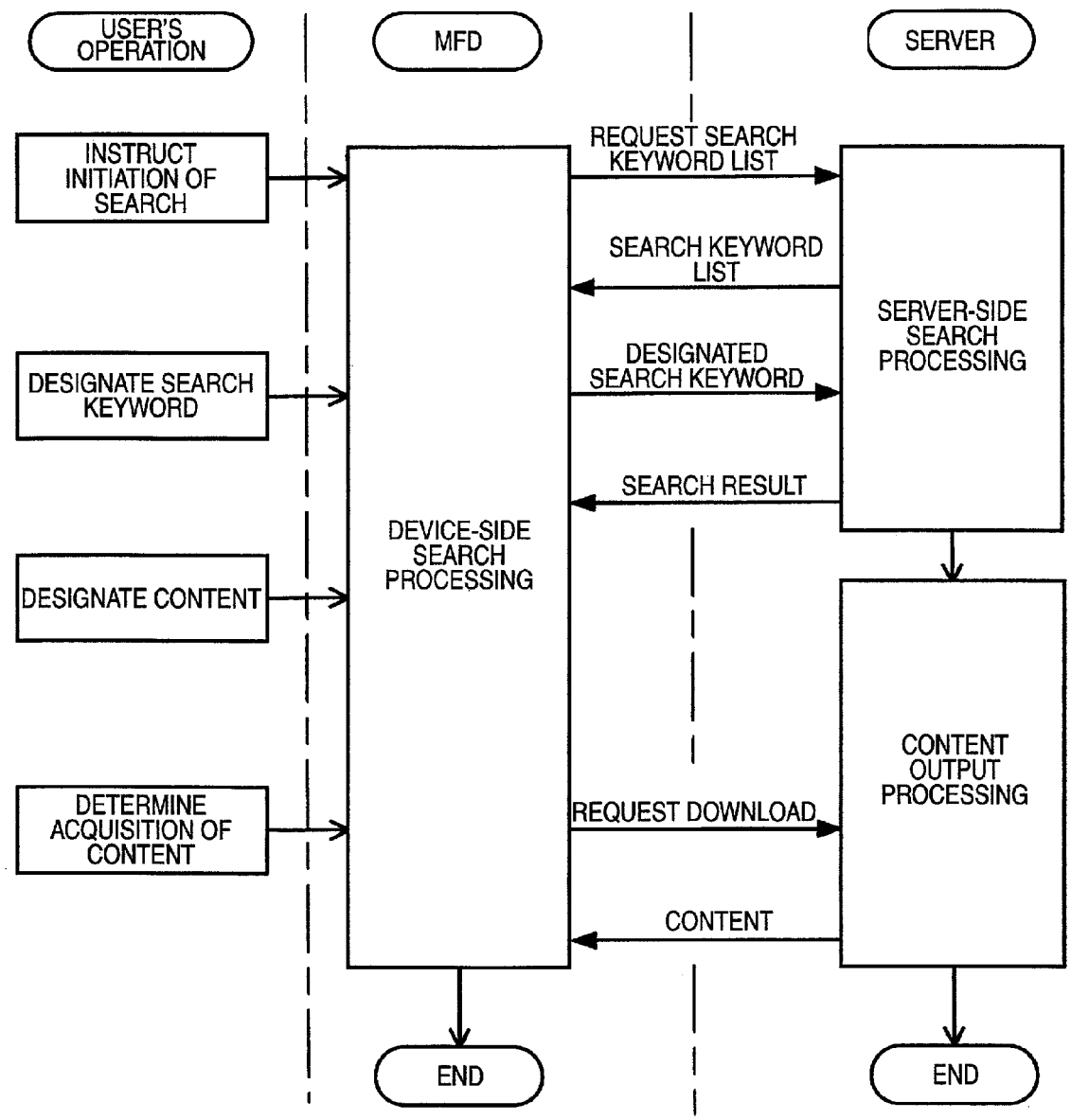
FIG. 19 shows an overall flow of a content search of the system.

FIG. 19 shows the overall content search flow of the system. The user operates the console 22 to input a search start instruction to the MFD 10. The MFD 10 performs device-side search processing in response to the user's instruction. When a "request for a search keyword list" is transmitted through the device-side search processing, the server 40 starts server-side search processing. In response to the "request for a search keyword list," the server 40 transmits a search keyword list. The received list of search keywords is displayed through device-side search processing. The user designates a desired search keyword from the displayed search keywords. It is noted that the user can designate a plurality of search keywords. The thus-designated search keyword is transmitted from the MFD 10 to the server 40. The server 40 extracts, from the search database, content matching the designated search keyword (content including the search keyword). At this time, a plurality of content may be extracted. The server 40 transmits a list of extracted content (a table) to the MFD 10. The MFD 10 displays a search result (content including the search keyword) by means of above-described processing.

When the user designates a desired content from the displayed list of content, the MFD 10 transmits a content ID of the content to the server 40 (not shown). Upon receipt of the content ID, the server 40 starts content output processing. Content output processing corresponds to a sub-module of the server-side search module.

The server 40 transmits information about the content identified by the content ID (not shown). When the user desires to download the content, the MFD 10 transmits a "request for a download" of the designated content to the server 40. The server 40 extracts the designated content from the search database and transmits the thus-extracted content to the MFD 10.

(Device-Side Search Processing)

Figure 20:
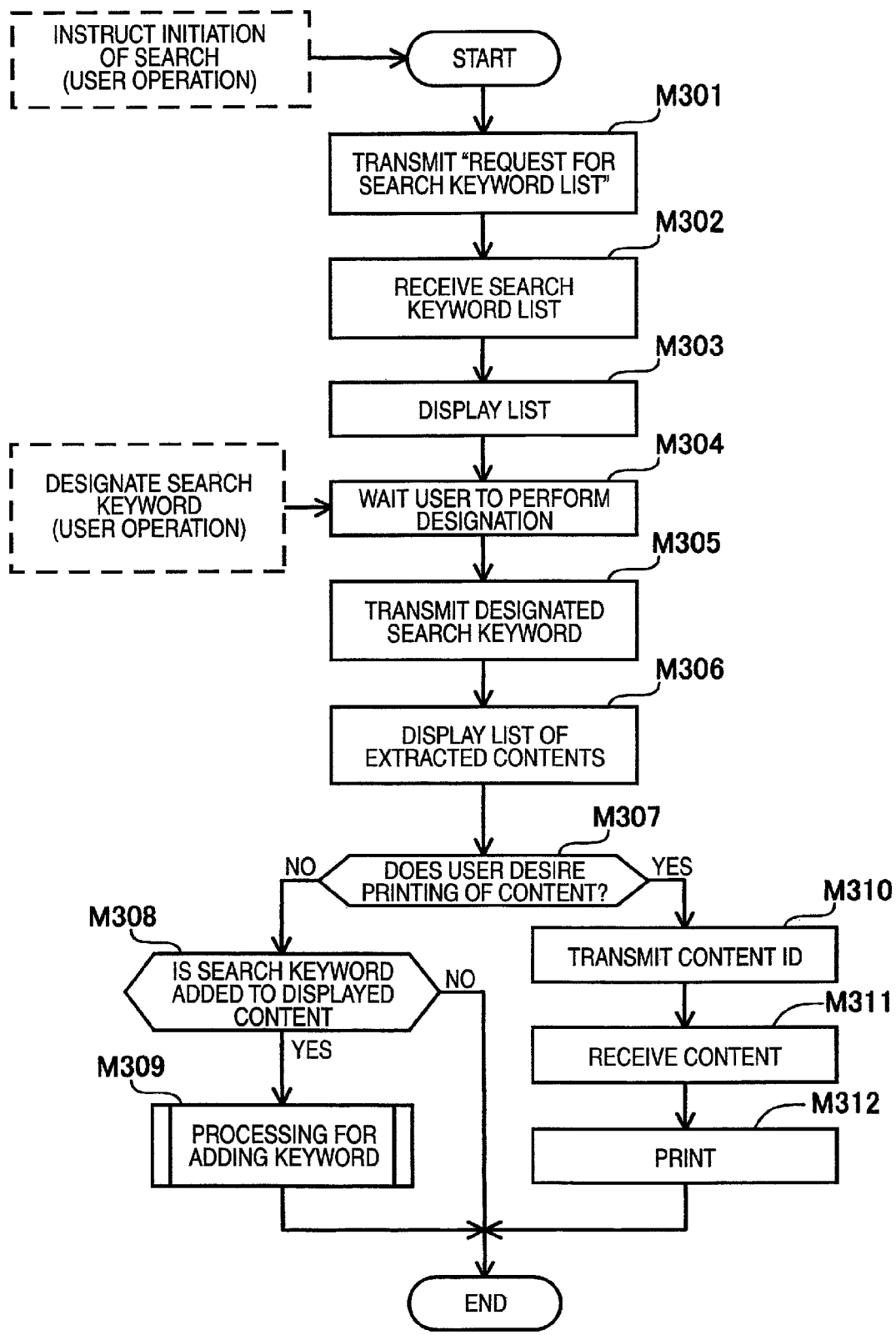
FIG. 20 shows a flowchart of device-side search processing.

FIG. 20 shows a flowchart of device-side search processing. Upon receipt of a search start processing instruction from the user, the MFD 10 transmits a "request for a search keyword list" to the server 40 (M301). In response to the "request for a search keyword list," the server 40 extracts a registered search keyword list from the search database and transmits the thus-extracted list to the MFD 10. The MFD 10 receives a list of search keywords from the server 40 (M302). The MFD 10 displays the received-list of search keyword lists (M303). The above-described FIG. 17 shows an example display of search keywords.

The MFD 10 waits for the user to designate a search keyword (M304). The user designates a search keyword presumed to be registered for desired content from the displayed list of search keywords. The MFD 10 transmits the designated search keyword to the server 40 (M305). The server 40 extracts content for which the designated search keyword is registered, from the search database and transmits the extracted content. The MFD 10 displays a list of the content extracted by the server 40 (M306). When the user desires printing of the content (YES in M307), the MFD 10 transmits a content ID of the content to the server 40 along with a print data request (M310). In response to the print data request, the server 40 transmits content designated by the content ID. The MFD 10 receives the content (M311) and prints the received content (M312).

Additionally, the user can also add a new search keyword to the content displayed in step M306 (M309). Keyword addition processing will be described later.

(Server-Side Search Processing)

Figure 21:
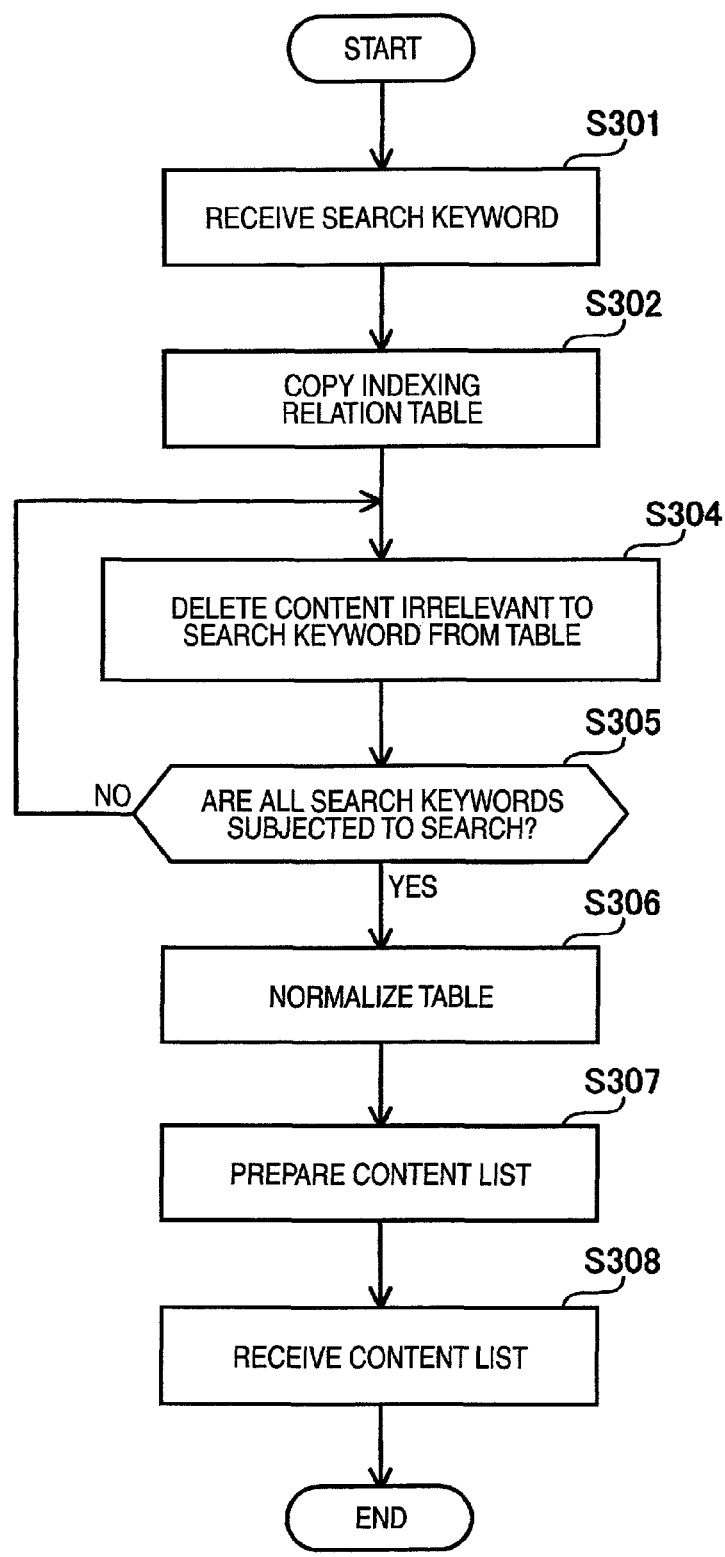
FIG. 21 shows a flowchart of server-side search processing.

FIG. 21 shows a flowchart of the server-side search processing. The server 40 receives the "request for a search keyword list" from the MFD 10 (S301). The server 40 next prepares a copy of the indexing relation table (S302). The thus-copied table is referred to as a "tmp_table." The indexing relation table, the content table which will be described in detail, and the like, are included in a group of tables constituting the search database as described above by reference to FIGS. 10 through 14.

The server 40 deletes, from the copied table, a record of content not associated with the search keyword received in step S301 (content for which the received search keyword is not registered) (S304). However, all records including a content ID that refers to the received search keyword are left. For example, in FIG. 13, if a received search keyword is a keyword represented by M001, a record A that refer to the keyword M001 and a record B including content identical with the record A (content specified by the content ID "D001"), are left (not deleted). The server 40 repeats processing pertaining to step S304 in connection with all search keywords received in step S301 (NO in step S305). This processing corresponds to extraction by a logical AND of a plurality of designated keywords. That is, the extraction by the logical AND can also be addressed by changing processing within a table of content which matches the keyword. After performing step S304 in connection with all of the search keywords (YES in step S305), the server 40 normalizes the table processed in step S304 (step S306). The term "normalize" used herein means deletion of overlapping content IDs from the content IDs left in the table.

The server 40 prepares a list of the remaining content IDs (a content list) (S307). Content IDs included in the thus-prepared content list are arranged in a list of content IDs for content associated with the search keyword received in step S301 (content for which the received search keyword is registered). Finally, the server 40 transmits the prepared content list to the MFD 10 (S308). At this time, meta data pertaining to respective content may be also transmitted.

(Content Output Processing)

Figure 22:
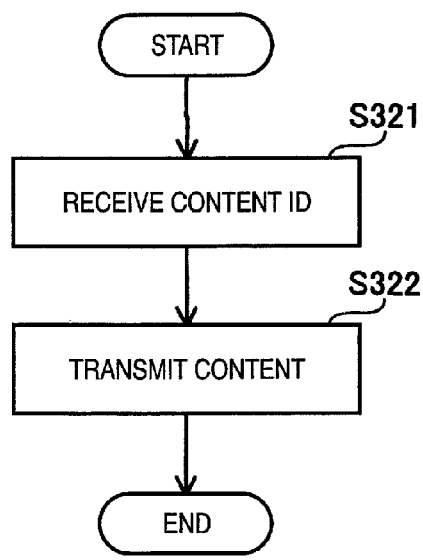
FIG. 22 shows a flowchart of content output processing.

FIG. 22 shows a flowchart of the content output processing. A content ID for the content desired to be output by the user is transmitted from the MFD 10 (step M310 in FIG. 20). The server 40 receives the content ID (S321). The server 40 extracts, from the search database, content identified by the received content ID and transmits the content to the MFD 10 (S322). The content desired by the user can be thus extracted.

4. Keyword Addition Processing

Figure 23:
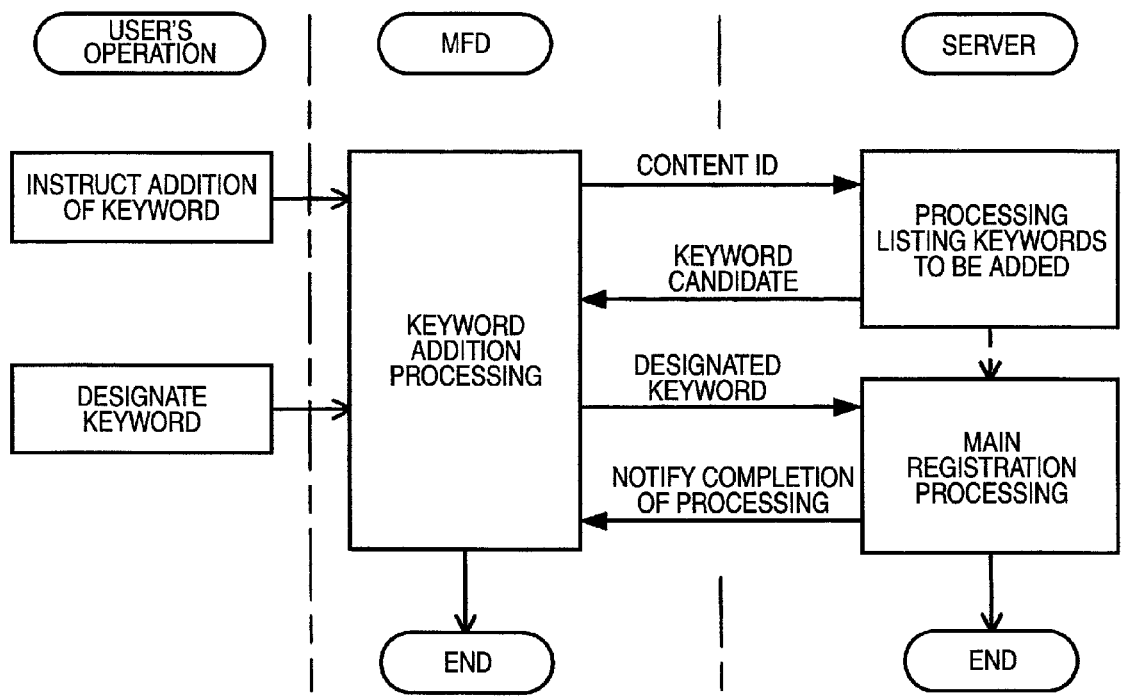
FIG. 23 shows an overall flow of the system performed when a keyword is added.

In the flow shown in FIG. 19, after the MFD 10 displays the table of search results, the user can add a search keyword for the desired content. FIG. 23 shows an overall flow of the system achieved at the time of addition of a keyword. When the user instructs addition of a keyword, the MFD 10 performs the keyword addition processing. At that time, the user designates a content ID of the content for which addition of a keyword is desired. The MFD 10 transmits the designated content ID to the server 40. The server 40 performs additional keyword listing processing, and lists keyword candidates associated with the content of the designated content ID. The server 40 transmits the thus-listed keyword candidates to the MFD 10. The MFD 10 shows the received keyword candidates. The user designates a keyword to be newly added from the displayed keyword candidates. The thus-designated keywords are transmitted to the server 40 and registered in the search database. The server-side definite registration processing for registering the designated keyword in the search database has already been described by reference to FIG. 5.

Figure 24:
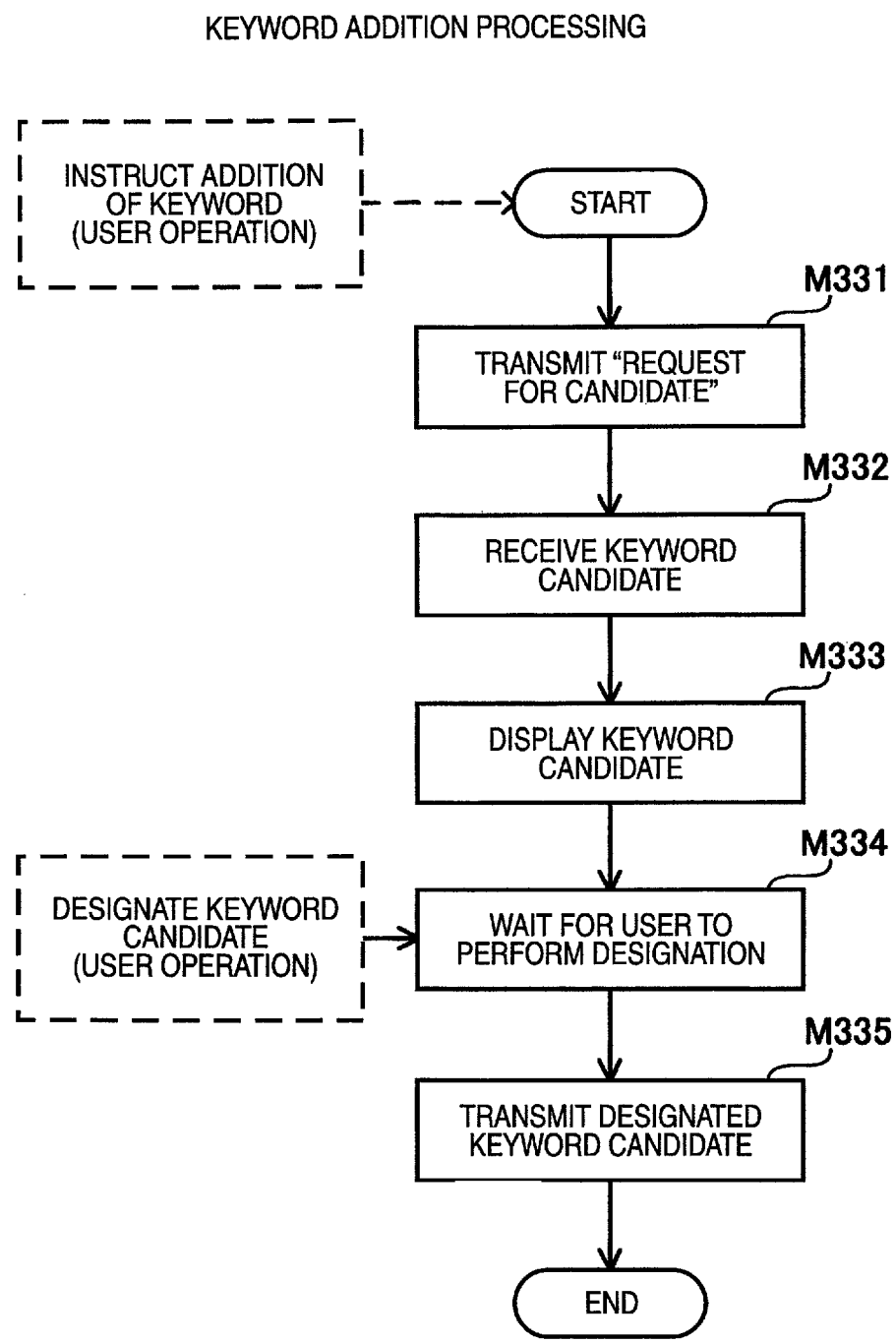
FIG. 24 shows a flowchart of keyword addition processing.

FIG. 24 shows a flowchart of keyword addition processing performed by the MFD 10. Upon receipt of an instruction for adding a keyword from the user, the MFD 10 transmits a "request for candidates" to the server (M331). In response to the "request for candidates," the server 40 lists keyword candidates and transmits the list of the keyword candidates. The MFD 10 receives the keyword candidates listed by the server 40 (M332). The MFD 10 displays the received keyword candidates (M333) and waits for an instruction from the user (M334). The user designates keyword candidates desired to be added from among the displayed keyword candidates. The MFD 10 transmits the keyword candidate designated by the user to the server 40 (M335). The server 40 adds the thus-designated keyword candidate to the search database.

(Additional Keyword Listing Processing)

FIG. 25 shows a flowchart of additional keyword listing processing performed by the server 40. Upon receipt of the "request for candidates," the server 40 prepares a copy of the indexing relation table (S351). The server 40 deletes, from the copied table, a record of content having a content ID different from the content ID of the content that becomes a target of the candidate request (S352). Next, the server 40 lists keyword candidates associated with the content left in the table by reference to the keyword table (S353). The server 40 transmits the listed keyword candidates to the MFD 10 (S354).

At the time of extraction of an additional keyword, the keyword candidates on which the "Flag_A" is set and the keyword candidates on which the "Flag_B" is set exist in the search database. Specifically, keywords that have been generated as keyword candidates previously but not registered as search keywords and keywords that are registered as search keywords exist. During the additional keyword listing processing, both keywords registered as search keywords and unregistered keywords are extracted. Thereby, many keyword candidates can be provided for the user.

In the meantime, as described above, only the search keyword is provided for the user at the time of search, and keyword candidates are not provided. At the time of search, only search keywords that may be designated by the user at a high probability are provided. The user can readily find a search keyword suitable for searching desired content from among the displayed keywords.

A brief summary of the content management system 100 described in connection with the exemplary embodiment is as follows. The MFD 10 has the device-side registration module 16 and the device-side search module 18. The server 40 has the server-side registration module 46 and the server-side search module 48.

The device-side registration modules perform the following operations including:

(1) transmitting new content to the server 40 (M103);

(2) receiving a content ID for identifying the new content and a plurality of keyword candidates for searching the new content from the server 40 (M106);

(3) displaying the received keyword candidates (M107); and (4) transmitting a keyword candidate designated by the user from the displayed keyword candidates to the server 40 along with the content ID received through processing (2).

The server-side registration modules perform the following operations including:

(a) receiving the new content from the MFD 10 (S101);

(b) generating the keyword candidates based on the received new content (S103);

(c) associating the received new content with the generated keyword candidates and generating the content ID for identifying the new content (S102 and S104);

(d) transmitting the generated content ID and the generated keyword candidates to the MFD 10 (S106);

(e) receiving a keyword candidate designated by the user and a content ID from the MFD 10 (S131); and (f) registering the designated keyword candidate as a search keyword in the search database 50 in association with content identified by the content ID received through processing (e).

The device-side search module performs the following operations including:

(5) issuing to the server 40 a request for a search keyword for searching registered content (M301);

(6) receiving the search keywords from the server 40 (M302);

(7) transmitting to the server 40 a search keyword designated by the user from among the received search keywords (M305);

(8) receiving from the server 40 registered content associated with the designated search keyword (M311); and (9) displaying the received, registered content (M312).

The server-side search module perform the following operations including:

(g) transmitting the search keyword registered in the search database to the content acquisition device in response to the request for a search keyword (the "search keyword list" shown in FIG. 9);

(h) extracting from the search database 50 registered content associated with the search keyword designated by the user (S307); and (i) transmitting the extracted, registered content to the MFD 10 (S308).

In the content management system, one content management device can intensively manage content acquired by a plurality of content acquisition devices. The content acquisition devices and the content management device can identify the contents by content IDs. After the content management device has received a new content, the content acquisition device can fetch the content any time from the content management device by designating its content ID. The content acquisition devices do not need to store contents. Management of contents becomes easy.

In the above-described exemplary embodiment, the content management system 100 includes the MFD 10 (the content acquisition device) and the server 40 (the management device). However, this is not limited thereto. The inventive concept of the present invention may also be applied to a single content management device having the function of the MFD 10 and the function of the server 40. In this case, the content management device can acquire various content and register the thus-acquired content in the search database. A plurality of keywords and content are registered in the search database. The content management device has a registration module and a search module. The registration module performs the following operations including:

extracting keyword candidates associated with new content from the search database 50 (S103);

displaying the extracted keyword candidates (M107);

registering, as a search keyword, in the search database the keyword candidate designated by the user from among the displayed keyword candidates in association with new content (S132);

displaying a search keyword registered in the search database (M303);

extracting from the search database 50 registered content associated with a search keyword designated by the user from among the displayed search keywords (S307); and displaying the extracted, registered content (M312).

When new content is registered, the content management device provides the user with keyword candidates associated with the new content. The user can freely select a desired keyword from among the plurality of keyword candidates associated with the new content. In the meantime, when content having already been registered is searched, the device provides the user with only the keyword registered as a search keyword in the past. Only the keyword that will be designated by the user with a great probability for searching the registered content is provided. The load imposed on the user for searching registered content can be lessened.

The registration module and the search module may be implemented in the form of software as well as in the form of hardware. A technique disclosed in the present specification may also be embodied by a program that manages contents or by a method for managing content. The content management method disclosed in the present specification may also be installed in a computer having a search database.

While the present invention has been shown and described with reference to certain exemplary embodiments thereof, it will be understood by those skilled in the art that various changes in form and details may be made therein without departing from the spirit and scope of the invention as defined by the appended claims.

Technical elements described in the present specification or drawings exhibit technical usefulness alone or by means of various combinations and are not limited to the combinations described in the claims at the time of application. The technique exemplified in the specification or the drawings simultaneously achieves a plurality of objects, and technical usefulness is exhibited as a result of achievement of any of the objects.

What is claimed is:

1. A content management device for managing acquired content in a searchable manner, the device comprising:
    a storage device configured to store a search database in which a plurality of keywords and content are registered;
    a registration unit configured to register new content in the search database; and
    a search unit configured to search content registered in the search database,
    wherein the registration unit is configured to perform operations comprising:
        extracting a plurality of keyword candidates associated with the new content from the search database based on the new content and meta data, which is generated when the new content is acquired, and which comprises information varying according to an acquisition path along which the new content is acquired;
        displaying the extracted keyword candidates; and
        registering a keyword candidate designated from among the displayed keyword candidates in the search database, as a search keyword in association with the new content, and
    wherein the search unit is configured to perform operations comprising:
        displaying a plurality of search keywords which already have been registered by the registration unit in the search database;
        extracting content, which is associated with a search keyword designated from among the displayed search keywords, and which already has been registered by the registration unit in the search database, from the search database; and
        displaying the extracted content,
    wherein the meta data includes one of information indicating that the acquisition path includes a facsimile reception, information indicating that the acquisition path includes a facsimile transmission, information indicating that the acquisition path includes a copy, and information indicating that the acquisition path includes a scan.

2. The content management device according to claim 1, wherein, when the new content is image data, the registration unit is configured to extract a word from the image data by an optical character reader and to use the extracted word as a keyword candidate of the plurality of keyword candidates.

3. The content management device according to claim 1, wherein, when the acquiring path comprises a facsimile reception, the meta data comprises:
    information indicating that the acquisition path comprises the facsimile reception; and
    a phone number of a transmission source.

4. The content management device according to claim 3, wherein the meta data further comprises a date and time of the facsimile reception.

5. The content management device according to claim 1, wherein, when the acquisition path comprises a scan, the meta data comprises:
    information indicating that the acquisition path comprises a scan; and
    a date and time of the scan.

6. A method for managing acquired content in a searchable manner, the method comprising:
    registering new content in a search database, the registering comprising:
        extracting a plurality of keyword candidates associated with the new content from the search database based on the new content and meta data, which is generated when the new content is acquired, and which includes information varying according to an acquisition path along which the new content is acquired;
        displaying the extracted keyword candidates; and
        registering a keyword candidate designated from among the displayed keyword candidates in the search database as a search keyword in association with the new content; and
    searching content registered in the search database, the searching comprising:
        displaying a plurality of search keywords which already have been registered by the registering step in the search database;
        extracting content, which is associated with a search keyword designated from among the displayed search keywords, and which already has been registered by the registering step in the search database, from the search database; and
        displaying the extracted content,
    wherein the meta data includes one of information indicating that the acquisition path includes a facsimile reception, information indicating that the acquisition path includes a facsimile transmission, information indicating that the acquisition path includes a copy, and information indicating that the acquisition path includes a scan.

7. The method according to claim 6, wherein, when the new content is image data, the extracting step of the registering step comprising extracting a word from the image data by an optical character reader and using the extracted word as a keyword candidate of the plurality of keyword candidates.

8. The method according to claim 6, wherein when the acquiring path comprises a facsimile reception, the meta data comprises:
    information indicating that the acquisition path comprises a facsimile reception; and
    a phone number of a transmission source.

9. The method according to claim 8, wherein the meta data further comprises a date and time of the facsimile reception.

10. The method according to claim 6, wherein, when the acquisition path comprises a scan, the meta data comprises:
    information indicating that the acquisition path comprises a scan; and
    a date and time of the scan.

* * * * *